(12) United States Patent
Sauerlander et al.

(10) Patent No.: US 8,076,872 B2
(45) Date of Patent: Dec. 13, 2011

(54) LIGHT EMITTING DIODE CIRCUIT AND ARRANGEMENT AND DEVICE

(75) Inventors: Georg Sauerlander, Eindhoven (NL); Bernd Ackermann, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 499 days.

(21) Appl. No.: 12/298,795

(22) PCT Filed: Apr. 20, 2007

(86) PCT No.: PCT/IB2007/051464
§ 371 (c)(1),
(2), (4) Date: Oct. 28, 2008

(87) PCT Pub. No.: WO2007/125466
PCT Pub. Date: Nov. 8, 2007

(65) Prior Publication Data
US 2009/0284174 A1    Nov. 19, 2009

(30) Foreign Application Priority Data

May 2, 2006  (EP) .................................... 06113399

(51) Int. Cl.
*H05B 39/06*    (2006.01)
(52) U.S. Cl. ........ 315/362; 315/294; 315/291; 315/216; 315/224; 315/185 R
(58) Field of Classification Search ............. 315/294, 315/250, 287, 161, 291, 224, 192, 297, 216, 315/194, 315, 312, 185 R, 247, 300, 302, 315/362
See application file for complete search history.

(56) References Cited

U.S. PATENT DOCUMENTS

| | | | |
|---|---|---|---|
| 6,285,139 B1 * | 9/2001 | Ghanem | 315/291 |
| 6,515,434 B1 * | 2/2003 | Biebl | 315/291 |
| 6,621,235 B2 * | 9/2003 | Chang | 315/216 |
| 6,864,641 B2 * | 3/2005 | Dygert | 315/216 |
| 7,023,147 B2 * | 4/2006 | Colby et al. | 315/291 |
| 7,122,971 B2 * | 10/2006 | Yeh et al. | 315/185 R |
| 7,487,089 B2 * | 2/2009 | Mozer | 704/246 |
| 7,675,240 B2 * | 3/2010 | Yang et al. | 315/192 |
| 7,733,034 B2 * | 6/2010 | Kotikalapoodi et al. | 315/294 |
| 2003/0112229 A1 * | 6/2003 | Pong et al. | 345/204 |
| 2005/0116665 A1 | 6/2005 | Colby et al. | |
| 2005/0151481 A1 * | 7/2005 | Hoo et al. | 315/224 |
| 2006/0022916 A1 | 2/2006 | Aiello | |

FOREIGN PATENT DOCUMENTS

| | | |
|---|---|---|
| EP | 1320284 A2 | 6/2003 |
| JP | 55127084 | 10/1980 |
| WO | 03056878 A1 | 7/2003 |

* cited by examiner

*Primary Examiner* — Vibol Tan
(74) *Attorney, Agent, or Firm* — Van C. Ernest; Mark L. Beloborodov

(57) ABSTRACT

Disclosed are light emitting diode circuits employing first sub-circuits including first light emitting diodes and connected in parallel with second sub-circuits including second light emitting diodes and switches for, in conducting states, switching on the second light emitting diodes and switching off the first light emitting diodes and for, in non-conducting states, switching off the second light emitting diodes and switching on the first light emitting diodes. The first sub-circuits and the second sub-circuits have different signal characteristics such as different minimum threshold voltages to be realized by using different kinds of light emitting diodes, by using different total numbers of serial light emitting diodes, or by adding threshold voltage elements to the first sub-circuits.

19 Claims, 4 Drawing Sheets

LIGHT EMITTING DIODE CIRCUIT AND ARRANGEMENT AND DEVICE

This application is a national stage application under 35 U.S.C. §371 of International Application No. PCT/IB2007/051464 filed on Apr. 20, 2007, and published in the English language on Nov. 8, 2007, as International Publication No. WO2007/125466, which claims priority to European Application No. 06113399.7 filed on May 2, 2006, incorporated herein by reference.

BACKGROUND

The invention relates to a light emitting diode circuit, and also relates to an arrangement comprising a light emitting diode circuit, to a device comprising a light emitting diode circuit or comprising an arrangement, to a method, to a computer program product and to a medium.

Examples of such a light emitting diode circuits are circuits comprising one or more light emitting diodes, without excluding other circuits. Examples of such a device are consumer products and non-consumer products.

A prior art light emitting diode circuit is known from EP 1 320 284 A2, which discloses several light emitting diode circuits and several drivers for driving these light emitting diode circuits.

In the prior art light emitting diode circuits, a first light emitting diode is switched on (off) with a first action, such as for example closing (opening) a first switch for showing (not showing) a first light to a user, and a second light emitting diode is switched on (off) with a second action, such as for example closing (opening) a second switch for showing (not showing) a second light to a user.

The prior art light emitting diode circuit is disadvantageous, inter alia, in that different actions such as closing (opening) different switches are required to activate (de-activate) different light emitting diodes for showing different kinds of light to a user. This is relatively complex.

SUMMARY

It is an object of the invention, inter alia, to provide a light emitting diode circuit that is relatively simple.

Further objects of the invention are, inter alia, to provide an arrangement comprising a light emitting diode circuit, a device comprising a light emitting diode circuit or comprising an arrangement, a method, a computer program product and a medium that are relatively simple.

According to the invention, the light emitting diode circuit comprises
  a first sub-circuit comprising a first light emitting diode, which first sub-circuit is connected to terminals, which terminals are connectable to a power supply, and
  a second sub-circuit comprising a second light emitting diode, which second sub-circuit is connected to the terminals, and which second sub-circuit further comprises a switch for, in a conducting state, switching on the second light emitting diode and switching off the first light emitting diode and for, in a non-conducting state, switching off the second light emitting diode and switching on the first light emitting diode.

By introducing two parallel sub-circuits, the first sub-circuit not comprising a switch and the second sub-circuit comprising the switch, it has become possible to activate one of the light emitting diodes and at the same time de-activate the other light emitting diode via one and the same switch. Thereto, the second sub-circuit should, for example, for the switch being in a conducting state, have a smaller signal threshold such as a smaller voltage threshold or a smaller current threshold than the first sub-circuit. In that case, for the switch being in the conducting state, the second light emitting diode will operate and the first light emitting diode won't, and vice versa for the switch being in the non-conducting state. Other options are not to be excluded.

The light emitting diode circuit according to the invention is further advantageous, inter alia, in that it may require less chip area compared to prior art light emitting diode circuits that comprise a switch per sub-circuit.

The fact that a switch is in a conducting state or in a non-conducting state respectively corresponds with an impedance of this switch being smaller than a threshold value or larger than this threshold value respectively.

An embodiment of the light emitting diode circuit according to the invention is defined by the one side of the switch being connected to one of the terminals and the other side of the switch being connected to one side of a part of the second sub-circuit, which part comprises the second light emitting diode, and the other side of the part of the second sub-circuit being connected to the other terminal. The presence of the switch inside the second sub-circuit does not exclude a presence of two switches instead of one switch inside the second sub-circuit. In that case, one side of a first switch is for example connected to a first terminal and the other side of the first switch is for example connected to the part of the second sub-circuit that comprises the second light emitting diode and the other side of this part is for example connected to one side of a second switch and the other side of the second switch is for example connected to a second terminal, whereby the first and second switches are operated simultaneously.

The previous embodiment is not to be looked at too narrowly. The driving of the switch is easier if one of its sides is connected to one of the terminals, but it is also conceivable that the switch is connected to neither of the terminals directly, for example in case of multiple light emitting diodes per string.

An embodiment of the light emitting diode circuit according to the invention is defined by the first and second light emitting diodes having different colors. This embodiment is advantageous for example in case of the light emitting diodes being used as backlights.

An embodiment of the light emitting diode circuit according to the invention is defined by further comprising
  a third sub-circuit comprising a third light emitting diode, which third sub-circuit is connected to the terminals, and which third sub-circuit further comprises a further switch for, in a conducting state, switching on the third light emitting diode and switching off the first light emitting diode and for, in a non-conducting state, switching off the third light emitting diode and, in case of the switch being in the non-conducting state also, switching on the first light emitting diode, with the switch in the non-conducting state switching on the first light emitting diode in case of the further switch being in the non-conducting state also. With the switch and the further switch, three sub-circuits can be activated and de-activated advantageously.

An embodiment of the light emitting diode circuit according to the invention is defined by one side of the further switch being connected to one of the terminals and the other side of the further switch being connected to one side of a part of the third sub-circuit, which part comprises the third light emitting diode, and the other side of the part of the third sub-circuit being connected to the other terminal. Again, the presence of the further switch inside the third sub-circuit does not exclude a presence of two switches instead of one switch inside the third sub-circuit etc.

The previous embodiment is not to be looked at too narrowly. The driving of the further switch is easier if one of its sides is connected to one of the terminals, but it is also conceivable that the further switch is connected to neither of the terminals directly, for example in case of multiple light emitting diodes per string.

An embodiment of the light emitting diode circuit according to the invention is defined by the first and second and third light emitting diodes having different colours. This embodiment is advantageous for example in case of the light emitting diodes being used as backlights.

An embodiment of the light emitting diode circuit according to the invention is defined by the first sub-circuit and the second sub-circuit having different signal-characteristics. The different signal-characteristics may for example comprise different voltage-characteristics and/or different current-characteristics and/or different voltage-current-characteristics, without excluding further characteristics, for the switch being in a conducting state. Of course, the second sub-circuit and the third-sub-circuit may have different signal-characteristics as well for the further switch being in a conducting state, whereby the signal-characteristics of the first and third sub-circuits might be identical or not for their switches being in conducting states.

An embodiment of the light emitting diode circuit according to the invention is defined by the different signal-characteristics comprising different minimum threshold voltages. Preferably, the minimum threshold voltage of the first sub-circuit will be larger than the minimum threshold voltage of the second sub-circuit for the switch being in a conducting state. Of course, preferably, the minimum threshold voltage of the first sub-circuit will be larger than the minimum threshold voltage of the third sub-circuit as well for the further switch being in a conducting state, whereby the minimum threshold voltages of the second and third sub-circuits might be identical or not for their switches being in conducting states.

An embodiment of the light emitting diode circuit according to the invention is defined by the first sub-circuit further comprising further first light emitting diodes and the second sub-circuit further comprising further second light emitting diodes, a sum of forward voltages of a string of first and/or further first light emitting diodes being larger than a sum of forward voltages of a string of second and/or further second light emitting diodes. By making the sum of the forward voltages of a string of first and/or further first light emitting diodes larger than the sum of the forward voltages of a string of second and/or further second light emitting diodes, the minimum threshold voltage of the first sub-circuit will be larger than the minimum threshold voltage of the second sub-circuit for the switch being in a conducting state. This might be done by selecting different kinds of light emitting diodes and/or by selecting different numbers of for example serially connected light emitting diodes. Of course, the third sub-circuit may further have further third light emitting diodes as well, with a sum of forward voltages of a string of first and/or further first light emitting diodes being larger than a sum of forward voltages of a string of third and/or further third light emitting diodes, to make the minimum threshold voltage of the first sub-circuit larger than the minimum threshold voltage of the third sub-circuit for the further switch being in a conducting state etc.

An embodiment of the light emitting diode circuit according to the invention is defined by the first sub-circuit further comprising a threshold voltage element serially connected to the first light emitting diode. Such a threshold voltage element for example comprises one or more diodes and/or one or more transistors for increasing a minimum threshold voltage of the first sub-circuit, without excluding other elements.

The light emitting diode arrangement according to the invention comprises the light emitting diode circuit according to the invention and further comprises the power supply.

An embodiment of the light emitting diode arrangement according to the invention is defined by the power supply comprising first and second transistors driven via a driver circuit, a first main electrode of the first transistor being coupled to one side of a voltage source, a second main electrode of the first transistor being coupled to a first main electrode of the second transistor and to one side of an inductor, a second main electrode of the second transistor being coupled to the other side of the voltage source and to one of the terminals, and the other side of the inductor being coupled to the other terminal.

With respect to the first and second transistors, it must be noted that there exists an important difference between these transistors and the one or more switches of the light emitting diode circuit. These one or more switches may be realized via transistors, without excluding other realizations. However, the one or more switches in the light emitting diode circuit will usually switch at a lower frequency<20 kHz, where the transistors of the power supply will usually switch at a higher frequency>1 MHz.

The device according to the invention comprises the light emitting diode circuit according to the invention or comprises the light emitting diode arrangement according to the invention.

Embodiments of the light emitting diode arrangement according to the invention and of the device according to the invention and of the method according to the invention and of the computer program product according to the invention and of the medium according to the invention correspond with the embodiments of the light emitting diode circuit according to the invention.

The invention is based on the insight, inter alia, that a switch per sub-circuit is relatively complex, and is based on the basic idea, inter alia, that a switch is to be introduced for, in a conducting state, switching on the second light emitting diode and switching off the first light emitting diode and for, in a non-conducting state, switching off the second light emitting diode and switching on the first light emitting diode.

The invention solves the problem, inter alia, to provide a light emitting diode circuit that is relatively simple. The light emitting diode circuit according to the invention is further advantageous, inter alia, in that it may require less chip area compared to prior art light emitting diode circuits that comprise a switch per sub-circuit.

These and other aspects of the invention will be apparent from and elucidated with reference to the embodiments(s) described hereinafter.

DETAILED DESCRIPTION

Figure 1:
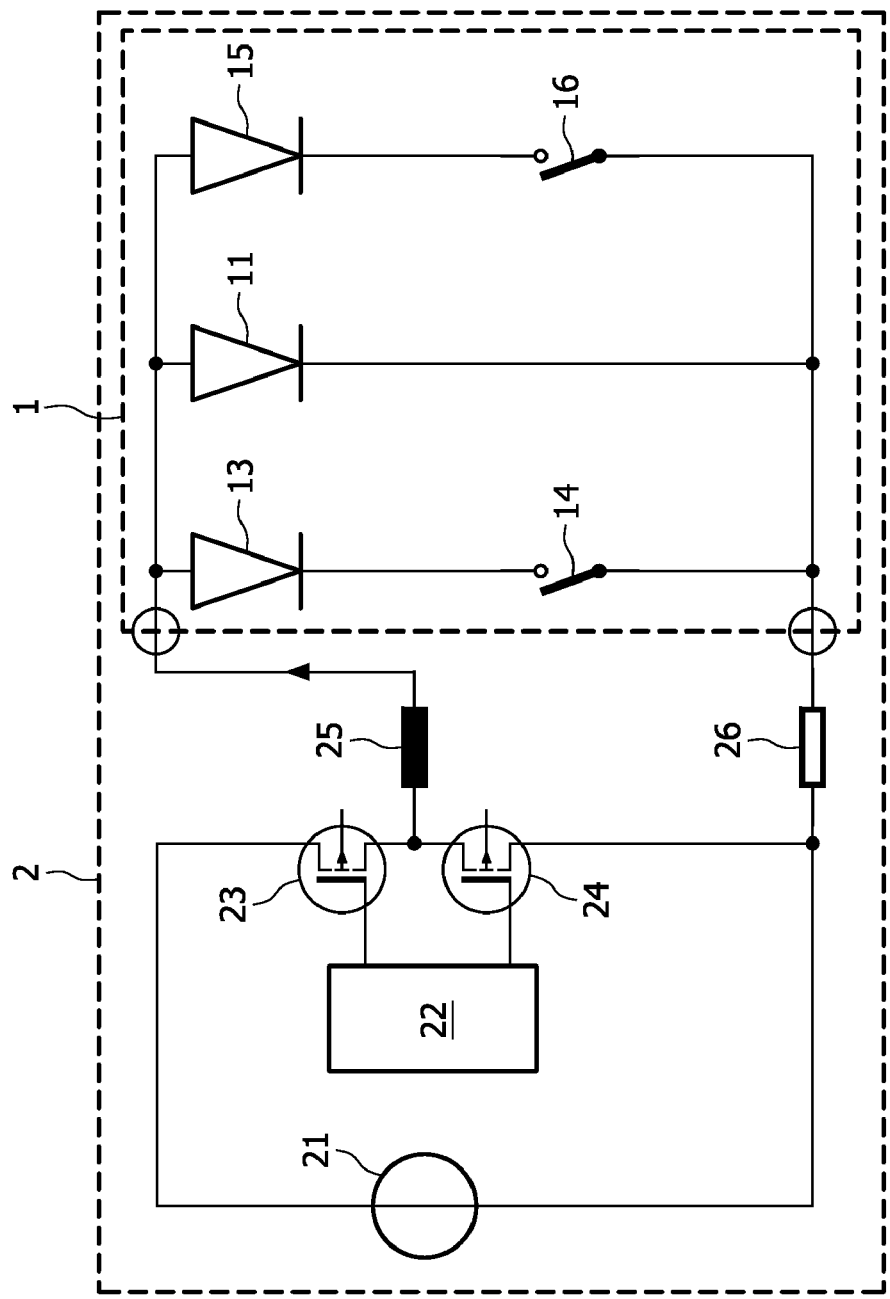
FIG. 1 shows diagrammatically a light emitting diode arrangement according to the invention comprising a light emitting diode circuit according to the invention.

The light emitting diode arrangement 2 according to the invention shown in FIG. 1 comprises a light emitting diode circuit 1 according to the invention and comprises a power supply 22-25 coupled to a voltage source 21. The power supply 22-25 comprises a first transistor 23 and a second transistor 24 driven via a driver circuit 22 that is coupled to the control electrodes of the transistors 23 and 24. A first main electrode of the first transistor 23 is coupled to one side of the voltage source 21, a second main electrode of the first transistor 23 is coupled to a first main electrode of the second transistor 24 and to one side of an inductor 25, the other side of the inductor 25 is coupled to a first terminal and a second main electrode of the second transistor 24 is coupled to the other side of the voltage source 21 and via an impedance 26 to a second terminal.

The light emitting diode circuit 1 comprises a first sub-circuit that is coupled to both terminals and that comprises a first light emitting diode 11. The light emitting diode circuit 1 further comprises a second sub-circuit that is coupled to both terminals and that comprises a serial connection of a second light emitting diode 13 and a switch 14. The light emitting diode circuit 1 further comprises a third sub-circuit that is coupled to both terminals and that comprises a serial connection of a third light emitting diode 15 and a further switch 16.

The switch 14, in a conducting state, switches on the second light emitting diode 13 and switches off the first light emitting diode 11 and, in a non-conducting state, switches off the second light emitting diode 13 and switches on the first light emitting diode 11 in case of the further switch 16 being in a non-conducting state also. The further switch 16, in a conducting state, switches on the third light emitting diode 15 and switching off the first light emitting diode 11 and, in the non-conducting state, switches off the third light emitting diode 15 and switches on the first light emitting diode 11 in case of the switch 14 being in the non-conducting state also.

By introducing three parallel sub-circuits, the first sub-circuit not comprising a switch and the second and third sub-circuits comprising the switches 14,16, it is possible to activate one of the light emitting diodes 11,13,15 and at the same time de-activate the other light emitting diodes 11,13,15 via two switches only (more in general: p sub-circuits or groups or branches or strings, and p−1 switches). Thereto, the second and third sub-circuits should, for example, for the switches 14,16 being in a conducting state, have a smaller signal threshold such as a smaller voltage threshold or a smaller current threshold than the first sub-circuit. In that case, for one of the switches 14,16 being in a conducting state, the second or third light emitting diode 13,15 will operate and the first light emitting diode 11 won't, and vice versa for both switches 14,16 being in a non-conducting state.

The fact that a switch 14,16 is in a conducting state or in a non-conducting state respectively corresponds with an impedance of this switch 14,16 being smaller than a threshold value or larger than this threshold value respectively.

Preferably, for example for using the light emitting diodes as backlights, the first and second and third light emitting diodes 11,13,15 will have different colors, such as green, red and blue respectively.

Figure 5:
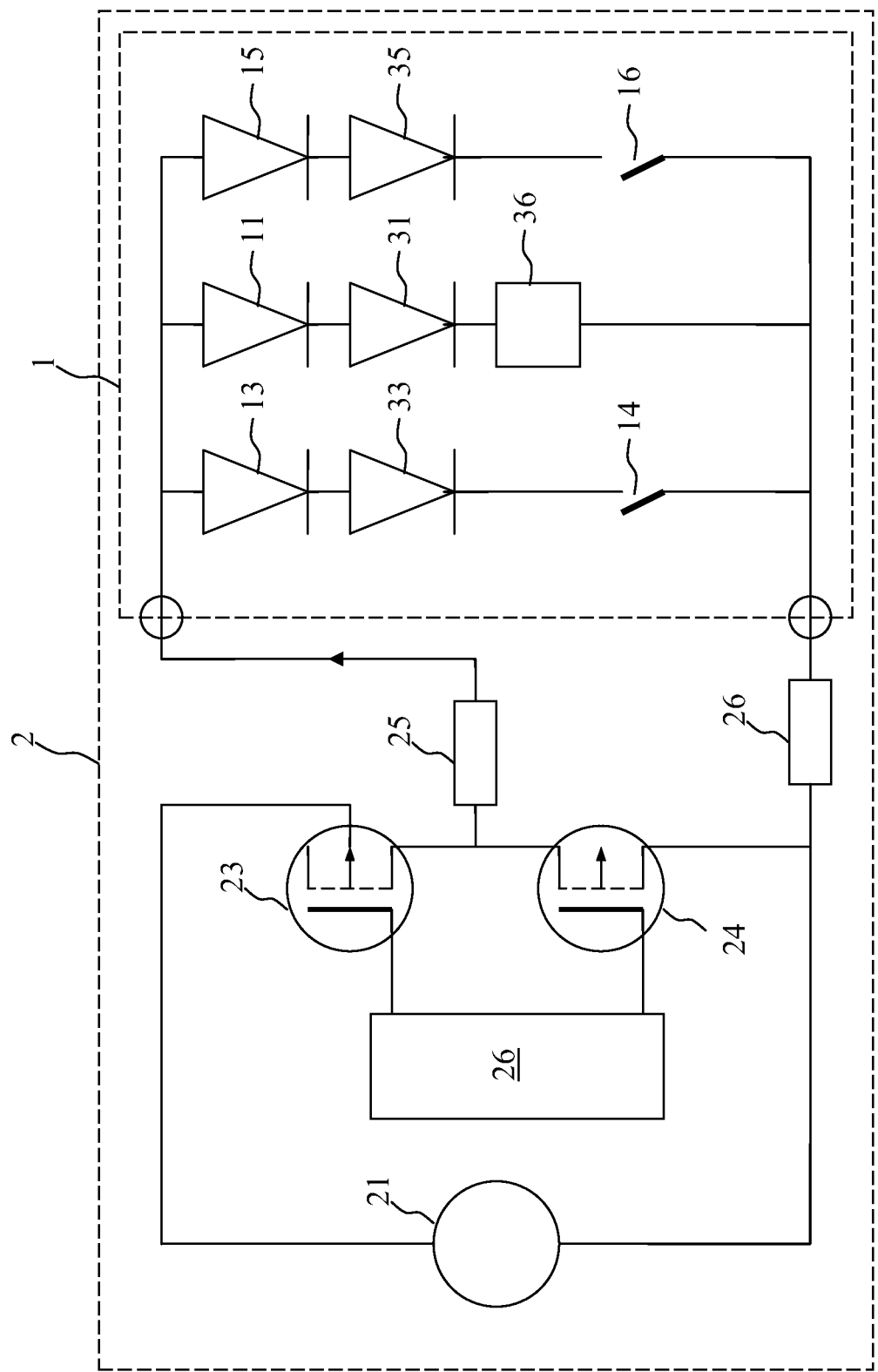
FIG. 5 shows diagrammatically a light emitting diode arrangement according to the invention comprising a light emitting diode circuit according to the invention.

Preferably, the first sub-circuit on the one hand and the second and third sub-circuits on the other hand will have different signal-characteristics, such as different minimum threshold voltages. Each light emitting diode 11, 13, 15 shown in the FIG. 1 may be replaced by two or more light emitting diodes, such as light emitting diodes 11-31, 13-33, and 15-35 shown in FIG. 5, preferably of the same color per sub-circuit. These two or more light emitting diodes may have per sub-circuit an entirely serial construction or an entirely parallel construction or a partially serial and partially parallel construction.

To realize the different signal-characteristics, according to a first option different kinds of light emitting diodes may be used. According to a second option, a total number of serial first light emitting diodes may be made larger than a total number of serial second (third) light emitting diodes. According to a third option, a threshold voltage element such as one or more (normal) diodes or a transistor circuit, as indicated by representative threshold voltage element 36 in FIG. 5, may be serially connected to the first light emitting diode(s). Mixtures of these options are not to be excluded.

Figure 2:
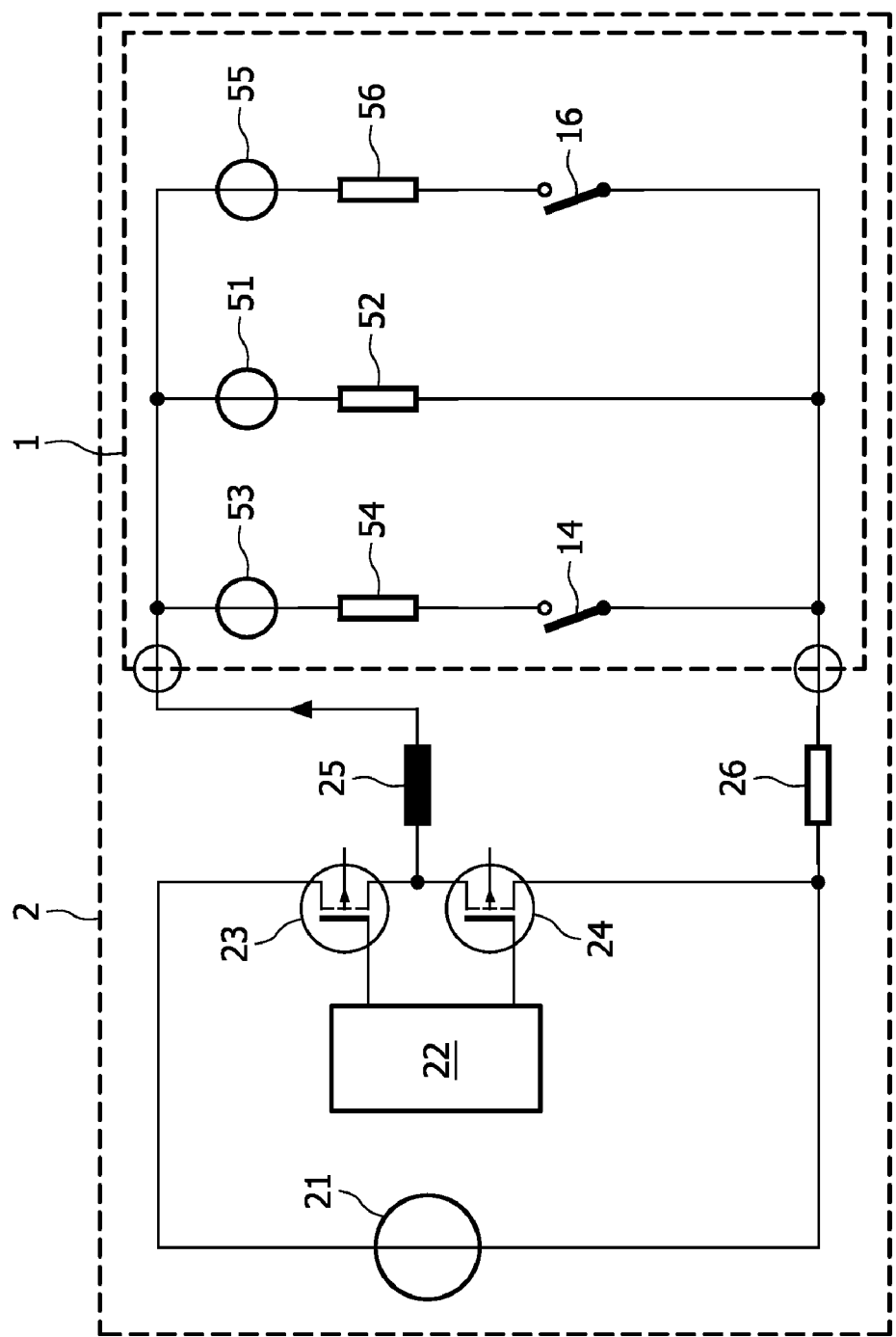
FIG. 2 shows diagrammatically a light emitting diode arrangement according to the invention comprising an equivalent light emitting diode circuit according to the invention.

The light emitting diode arrangement 2 according to the invention shown in the FIG. 2 corresponds with the one shown in the FIG. 1 apart from the fact that in the light emitting diode circuit 1 the light emitting diodes 11,13,15 have been replaced by their equivalent circuits. As a result, for the first light emitting diode 11, a serial connection of a voltage source 51 (Uthreshold) and an impedance 52 (R) is shown (in case of m first light emitting diodes 11, this would become m·Uthreshold and m·R). For the second light emitting diode 13, a serial connection of a voltage source 53 (Uthreshold) and an impedance 54 (R) is shown (in case of n second light emitting diodes 13, this would become n·Uthreshold and n·R). For the third light emitting diode 15, a serial connection of a voltage source 55 (Uthreshold) and an impedance 56 (R) is shown (in case of n third light emitting diodes 15, this would become n·Uthreshold and n·R).

Figure 3:
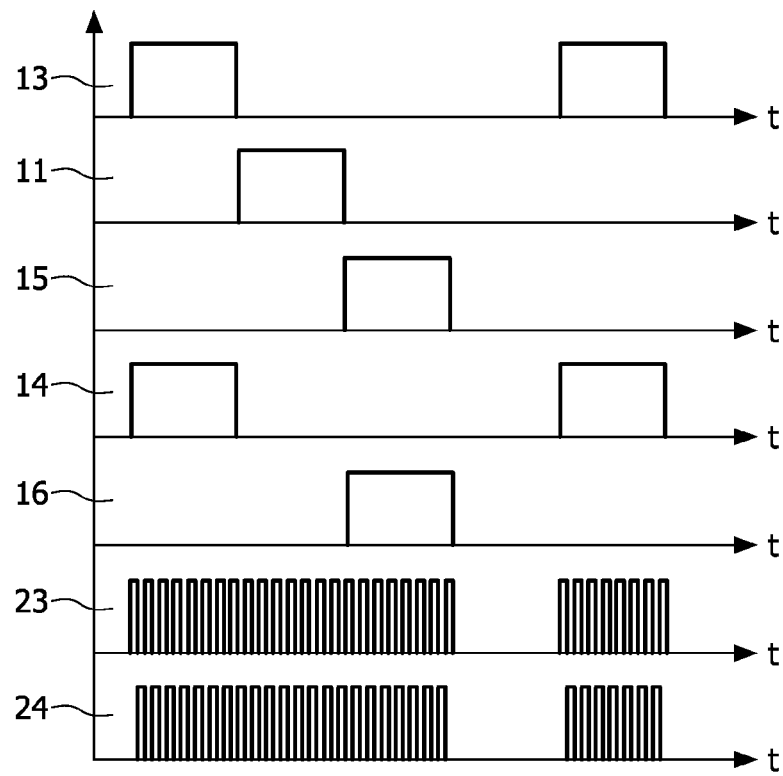
FIG. 3 shows signals in and for the light emitting diode arrangement according to the invention.

In the FIG. 3, signals in and for the light emitting diode arrangement 2 according to the invention are shown. Clearly, when the switch 14 is in a conducting state (indicated by "1"), the second light emitting diode 13 is emitting. When the further switch 16 is in a conducting state (indicated by "1"), the third light emitting diode 15 is emitting. When both switches 14,16 are in a non-conducting state (indicated by "0"), the first light emitting diode 11 is emitting, but only during operation of the first and second transistors 23,24 that are switched in an anti-phase way. The different frequencies of the switches 14,16 on the one hand and the transistors 23,24 on the other hand are also clearly shown.

Figure 4:
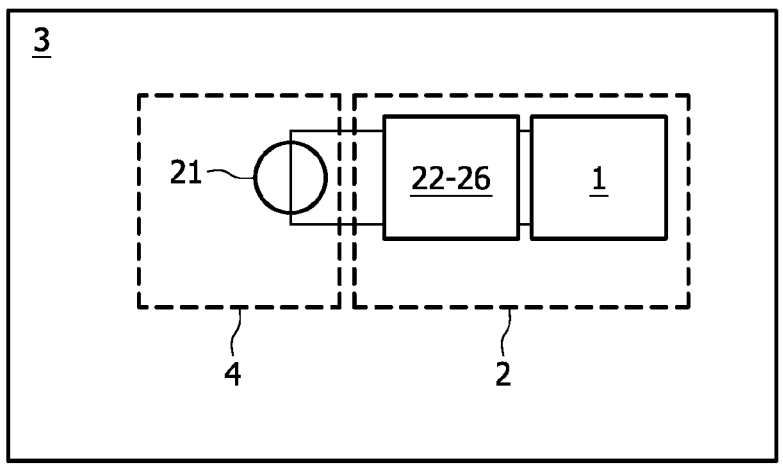
FIG. 4 shows diagrammatically a device according to the invention comprising a light emitting diode arrangement according to the invention and/or a light emitting diode circuit according to the invention.

The device 3 according to the invention shown in the FIG. 4 comprises a light emitting diode arrangement 2 according to the invention and/or a light emitting diode circuit 1 according to the invention and further comprises for example an AC-DC converter 4 that in this case comprises the voltage source 21. In other words, this AC-DC converter for example receives AC Volt and converts it into DC Volt that is supplied to the power supply 22-25 etc.

The invention may be explained by the fact that light emitting diodes require a minimum positive forward voltage before they start conducting and generating light. This voltage is also known as the LED threshold voltage Vth. In the simplified schematic of the FIG. 2 each string of LEDs is represented by a multiple of the LED series resistance and a multiple of the LED threshold voltage Vth. Assuming equal threshold voltages for red, green and blue LEDs and the power supply generating a constant current, the string voltage of the red or blue string during conduction (with the respective switch activated) will be smaller than the minimum voltage needed for the green LEDs to start conducting (m>n). For that reason, green LEDs will not emit any light when the blue or red LEDs are on, even though both strings are connected in parallel and the green string is not actively disconnected by its own load switch. If green LEDs significantly gain in efficiency in the future (m≈n), a difference in forward voltage drop for GaP-type LEDs as compared to GaN-type LEDs may still be sufficient to omit one switch in many applications.

The invention is especially suited for devices like LCD-TVs with color-sequential backlight but can be used for a wide range of LED lamps with variable color, too, or for LED lamps producing white light by mixing the light of several LEDs e.g. for general illumination. It also offers advantages in multi-string and/or multi-color OLED applications because for OLED devices the forward voltage drop to a certain extend can be tailored to a desired value. This allows one string of OLED devices to be designed to a total forward voltage drop that is always high enough to omit the respective switch.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A light emitting diode circuit comprising:
    a first sub-circuit comprising at least one first light emitting diode serially connected with a threshold voltage element, the first sub-circuit being connected to a pair of terminals, comprising a first terminal and a second terminal; and
    a second sub-circuit comprising at least one second light emitting diode serially connected with a first switch, the second sub-circuit being connected to the pair of terminals in parallel with the first sub-circuit,
    wherein the first switch, in a conducting state, switches on the second light emitting diode and switches off the first light emitting diode and, in a non-conducting state, switches off the second light emitting diode and switches on the first light emitting diode, and
    wherein the threshold voltage element is not a light emitting diode, and is configured to increase a first minimum threshold voltage of the first sub-circuit to be greater than a second minimum threshold voltage of the second sub-circuit.

2. The light emitting diode circuit of claim 1, wherein a first end of the first switch is connected to the first terminal and a second end of the first switch is connected to a part of the second sub-circuit comprising the second light emitting diode and extending between the second end of the first switch and the second terminal.

3. The light emitting diode circuit of claim 1, wherein the first and second light emitting diodes emit light of different colors.

4. The light emitting diode circuit of claim 1, further comprising:
    a third sub-circuit comprising at least one third light emitting diode serially connected with a second switch, the third sub-circuit being connected to the pair of terminals in parallel with the first and second sub-circuits, wherein the second switch, in a conducting state, switches on the third light emitting diode and switches off the first light emitting diode and, in a non-conducting state, switches off the third light emitting diode and switches on the first light emitting diode when the first switch is in the non-conducting state.

5. The light emitting diode circuit of claim 4, wherein a first end of the second switch is connected to the first terminal and a second end of the second switch is connected to a part of the third sub-circuit comprising the third light emitting diode, and extending between the second end of the second switch and the second terminal.

6. The light emitting diode circuit of claim 4, wherein the first, second, and third light emitting diodes emit light of different colors.

7. The light emitting diode circuit of claim 1, wherein the first sub-circuit and the second sub-circuit have different signal-characteristics.

8. The light emitting diode circuit of claim 7, wherein the first sub-circuit comprises a plurality of first light emitting diodes and the second sub-circuit comprises a plurality of second light emitting diodes, and wherein a sum of forward voltages of the plurality of first light emitting diodes and the threshold voltage element is larger than a sum of forward voltages of the plurality of second light emitting diodes.

9. A light emitting diode device comprising the light emitting diode circuit of claim 1 and further comprising a power supply connected to the pair of terminals.

10. The light emitting diode device of claim 9, wherein the power supply comprises first and second transistors driven via a driver circuit, a first main electrode of the first transistor being coupled to one side of a voltage source, a second main electrode of the first transistor being coupled to a first main electrode of the second transistor and to one side of an inductor, a second main electrode of the second transistor being coupled to the other side of the voltage source and to one of the pair of terminals, and the other side of the inductor being coupled to the other terminal of the pair of terminals.

11. A light emitting diode circuit, comprising:
    a first sub-circuit comprising at least one first light emitting diode, the first sub-circuit being connected to a first terminal and a second terminal;
    a second sub-circuit comprising at least one second light emitting diode in series with a first switch, the second sub-circuit being connected to the first and second terminals in parallel with the first sub-circuit, wherein the first switch is configured to switch on the at least one second light emitting diode and switch off the at least one first light emitting diode in a conducting state, and to switch off the at least one second light emitting diode and switch on the at least one first light emitting diode in a non-conducting state; and
    a third sub-circuit comprising at least one third light emitting diode in series with a second switch, the third sub-circuit being connected to the first and second terminals in parallel with the first and second sub-circuits, wherein the second switch is configured to switch on the at least one third light emitting diode and switch off the at least one first light emitting diode in a conducting state, and to switch off the at least one third light emitting diode and switch on the at least one first light emitting diode in a non-conducting state when the first switch is in the non-conducting state.

12. The light emitting diode circuit of claim 11, wherein a first end of the first switch is connected to the first terminal and a second end of the first switch is connected to a part of the second sub-circuit comprising the at least one second light emitting diode and extending between the second end of the first switch and the second terminal, and wherein a first end of the second switch is connected to the first terminal and a second end of the second switch is connected to a part of the third sub-circuit comprising the at least one third light emitting diode, and extending between the second end of the second switch and the second terminal.

13. The light emitting diode circuit of claim 11, wherein the first, second and third light emitting diodes emit light of different colors, respectively.

14. The light emitting diode circuit of claim 11, wherein the first sub-circuit has different signal-characteristics than each of the second sub-circuit and the third sub-circuit.

15. The light emitting diode circuit of claim 14, wherein the first sub-circuit further comprises a threshold voltage element serially connected to the first light emitting diode.

16. The light emitting diode circuit of claim 14, wherein the second sub-circuit and the third sub-circuit have the same signal-characteristics.

17. The light emitting diode circuit of claim 14, wherein the different signal-characteristics include different minimum threshold voltages.

18. The light emitting diode circuit of claim 14, wherein the first sub-circuit comprises a plurality of first light emitting diodes and the second sub-circuit comprises a plurality of second light emitting diodes, and wherein a sum of forward voltages of the plurality of first light emitting diodes is larger than a sum of forward voltages of the plurality of second light emitting diodes.

19. A method for controlling light emitting diodes of a light emitting diode circuit comprising a first sub-circuit comprising a first light emitting diode and connected to a pair of terminals, a second sub-circuit comprising a second light emitting diode and a first switch connected to the pair of terminals in parallel with the first sub-circuit second, and a third sub-circuit comprising a third light emitting diode and a second switch connected to the pair of terminals in parallel with the first and second sub-circuits, the method comprising:

activating the first light emitting diode by placing the first switch and the second switch to a non-conducting state;

activating the second light emitting diode by placing the first switch in a conducting state and the second switch in the non-conducting state; and activating the third light emitting diode by placing the second switch in a conducting state and the first switch in the non-conducting state.

* * * * *